United States Patent
Wilhelm et al.

[19]

[11] Patent Number: 5,804,307
[45] Date of Patent: Sep. 8, 1998

[54] RUBBER THREAD

[75] Inventors: John F. Wilhelm, Riverside; J. Kevin O'Neill, Cumberland, both of R.I.; John Friar, II, Fall River, Mass.; Ralph Maglio, Bristol, R.I.; Edward Cabral, Fall River, Mass.

[73] Assignee: North American Rubber Thread Co., Inc., Fall River, Mass.

[21] Appl. No.: 907,692

[22] Filed: Aug. 8, 1997

Related U.S. Application Data

[62] Division of Ser. No. 540,180, Oct. 5, 1995, Pat. No. 5,679,196.

[51] Int. Cl.⁶ ...................................................... D02G 3/00
[52] U.S. Cl. ............................ 428/373; 428/374; 428/390
[58] Field of Search ..................................... 428/364, 373, 428/374, 390

[56] References Cited

U.S. PATENT DOCUMENTS

| | | |
|---|---|---|
| 1,545,257 | 7/1925 | Hopkinson et al. . |
| 1,551,553 | 9/1925 | Gibbons et al. . |
| 1,570,895 | 1/1926 | Hopkinson et al. . |
| 1,902,953 | 3/1933 | Hazell . |
| 1,924,923 | 8/1933 | Gibbons . |
| 1,924,924 | 8/1933 | Gibbons . |
| 1,975,153 | 10/1934 | Jacquet . |
| 1,986,106 | 1/1935 | Gibbons et al. . |
| 2,058,032 | 10/1936 | Murphy . |
| 2,063,180 | 12/1936 | Meyer et al. . |
| 2,192,938 | 3/1940 | Sheperd . |
| 2,199,882 | 5/1940 | Inokuchi et al. . |
| 2,238,885 | 4/1941 | James et al. . |
| 2,273,082 | 2/1942 | Aldrich . |
| 2,313,296 | 3/1943 | Lamesch . |
| 2,333,699 | 11/1943 | Brosi . |
| 2,428,046 | 9/1947 | Sisson et al. . |
| 2,612,679 | 10/1952 | Ladisch . |
| 2,674,025 | 4/1954 | Ladisch . |
| 2,708,617 | 5/1955 | Magat et al. . |
| 2,935,371 | 5/1960 | Magat . |
| 2,987,797 | 6/1961 | Breen . |
| 3,038,235 | 6/1962 | Zimmerman . |
| 3,240,622 | 3/1966 | Chandler . |
| 3,399,108 | 8/1968 | Olson . |

*Primary Examiner*—Newton Edwards
*Attorney, Agent, or Firm*—Fish & Richardson P.C.

[57] ABSTRACT

A rubber thread includes in cross-section a first rubber portion and a second rubber portion.

38 Claims, 4 Drawing Sheets

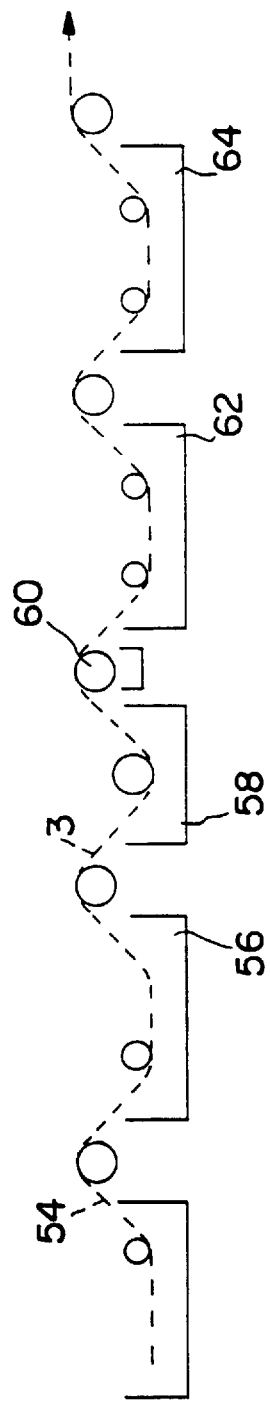

RUBBER THREAD

This is a divisional of application Ser. No. 08/540,180 filed Oct. 5, 1995, now 5,679,196.

BACKGROUND OF THE INVENTION

The invention relates to rubber thread.

Rubber thread is commonly used in a number of products, including narrow elasticized fabric for textile applications such as waist bands and shoulder straps of foundation garments, for toys, and for braided ("bungee") cord. Rubber thread typically is composed of natural rubber, which has excellent resiliency and other desirable properties such as high elongation, and it is useful through a wide range of temperatures.

Rubber thread has been made by cutting narrow strips from sheet rubber, yielding thread with a square cross-section. Another method involves streaming uncoagulated fluid rubber ("latex" compound) through a small-aperture nozzle or capillary into a bath of coagulant, e.g., acetic acid, washing the coagulated thread in a water bath, and drying and heat-curing the final product.

SUMMARY OF THE INVENTION

The invention features a rubber thread that has, in cross-section, two or more rubber portions. One rubber portion can be, for example, the central core of the rubber thread, while a second rubber portion can be a jacket surrounding the central core.

A rubber thread with two rubber portions can have a mix of properties, some provided by the first rubber portion, and others by the second rubber portion. For example, in the core/jacket embodiment, the core can be composed of natural rubber, and thus provide the thread with excellent resiliency, and the jacket can be composed of a sturdier, synthetic rubber that is more resistant to abrasion, fire, or chemical attack than natural rubber. The resultant two-portion rubber thread thus will be resistant to abrasion, fire, or chemical attack because the outer portion of the thread is composed of a rubber tailored to that purpose, while also having excellent resiliency because the core is composed of natural rubber. Similarly, a two-portion rubber thread with an outer jacket of synthetic rubber may be preferred to wholly natural thread by customers seeking a hypoallergenic product.

The properties provided by various rubber portions can be aesthetic. For example, referring to the core/jacket embodiment, a rubber thread having a particular color can be provided by including a colorant exclusively in the outer jacket portion of the thread. Thus, a rubber thread composed entirely of natural rubber can have an outer portion including the colorant, and an inner portion not including a colorant. Alternatively, the inner portion and outer portion can include different colorants, providing a rubber thread that in cross-section has two distinct, selected colors.

The properties provided by the various rubber portions may facilitate manufacture of the thread itself or of products made from that thread. For example, if dense chloroprene rubber is included in the outer portion to enhance fire retardancy, a lower density rubber may be used in the core of the thread to offset the high specific gravity of the chloroprene and to prevent the thread from sinking to the bottom of the coagulation bath. In another example, the coating may be used to adhere adjacent, touching threads into a flat tape which cannot readily be separated back to its component threads.

The invention also features a method of making a rubber thread that has in cross-section two rubber portions. The method includes combining a first rubber portion and a second rubber portion. The first rubber portion and/or the second rubber portion is an uncoagulated latex compound when the portions are combined. This provides a rubber thread that, in cross-section, has an area composed of the first rubber portion and an area composed of the second rubber portion, that is a different rubber than the first portion. In one preferred method, the two rubber portions (in uncoagulated form) are coextruded (either coaxially or non-coaxially) to provide an uncoagulated rubber thread composed of two portions. The rubber materials then are coagulated to provide the two-portion rubber thread.

In a second preferred method, a rubber thread including the first rubber portion is coated with the second rubber portion. The second rubber portion when coated may be uncoagulated, and after coating can be contacted with a coagulating agent. Preferably, the uncoagulated rubber includes a sensitizer that promotes rapid coagulation of the coating, thus preventing its removal as the thread passes through the process. The invention also features a method of making a rubber thread, by concentrically coextruding an inner stream of a first rubber portion and an outer stream of either a second rubber portion or a non-rubber portion. This results in a rubber thread in which the first rubber portion is centrally located, surrounded by the second rubber portion or non-rubber portion.

"Rubber," as used herein, is a material that when in a solid form such as a thread can be extehded under ambient conditions to at least twice its resting length and, upon stress release, can return to within 15% of its original length.

"Thread," as used herein, means a fiber of any cross-sectional shape or number of continuous filaments of any average diameter from about 0.200 inch to about 0.0008 inch.

"Coextrusion," as used herein, means the combining of two fluid streams into a single fluid stream.

Other features and advantages of the invention will be apparent from the description of the preferred embodiments thereof, and from the claims.

BRIEF DESCRIPTION OF THE DRAWING

FIGS. 2 and 5 are illustrations of two methods of making rubber thread.

DESCRIPTION OF THE PREFERRED EMBODIMENTS

Figure 1:
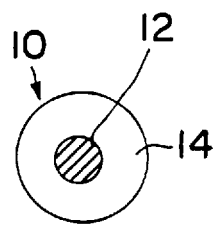
FIG. 1 is a cross-sectional view of a rubber thread having two rubber portions.

Referring to FIG. 1, a rubber thread 10 includes a core 12 and a surrounding jacket 14.

The core 12 preferably is composed of a natural rubber. A natural rubber core ensures that the thread has good resiliency, particularly when the jacket 14 is not composed of natural rubber. The core preferably composes between 10% and 99%, and more preferably between 80% and 95%, of rubber thread 10 by weight.

The jacket 14 preferably is composed of (1) a natural or synthetic rubber that includes a colorant to provide it with a different color than the core 12, or (2) a synthetic rubber (with or without a colorant) that provides protection to the underlying core. The synthetic rubber may provide abrasion resistance, oil resistance, solvent resistance, ozone resistance, UV light resistance, burn resistance, oxidation resistance, or chemical resistance generally. The synthetic rubber, for example, may be resistant to solvents, oils, and/or metals such as copper and manganese. Examples of preferred synthetic rubbers are acrylonitrile-butadiene (nitrile) rubbers, chloroprene rubbers, and mixtures of nitrile and chloroprene rubbers. Synthetic rubbers may also include polyurethanes, butyl, polyisoprene, and styrene-butadiene rubber, or blends thereof, and the rubber may be in the form of a true solution (in a suitable solvent), or in the form of a water-based latex.

The colorant used in the jacket may improve the appearance of the rubber thread, or provide the thread with particular cosmetic properties. For example, the jacket may include a whitener that provides a whiter-appearing thread, or a colorant that glows in the dark. The colorant also may be temperature or light sensitive, or may be selected to provide a special effect in which the jacket has one color, and the core, which may also contain a colorant, has a different, contrasting color. In another approach, all of the colorant which would normally be mixed uniformly throughout the thread may be concentrated completely in the jacket for a more powerful effect. The jacket may include, for example, between 0.1 percent and 30 percent colorant by weight.

Often, it will be preferable to provide a jacket that is as thin as possible. When the jacket is composed of a synthetic rubber that has less elasticity than the natural rubber core, providing a thick jacket potentially may negatively affect the adhesion of the jacket or resiliency of the rubber thread. Moreover, synthetic rubber may be more expensive than natural rubber. In addition, when only the jacket includes a colorant the thinner the jacket the less colorant used in total in manufacturing the thread. Preferably, the jacket composes between 1% and 90%, and more preferably between 4% and 20%, of the rubber thread by weight.

There are two preferred methods for making rubber thread 10.

Figure 2:
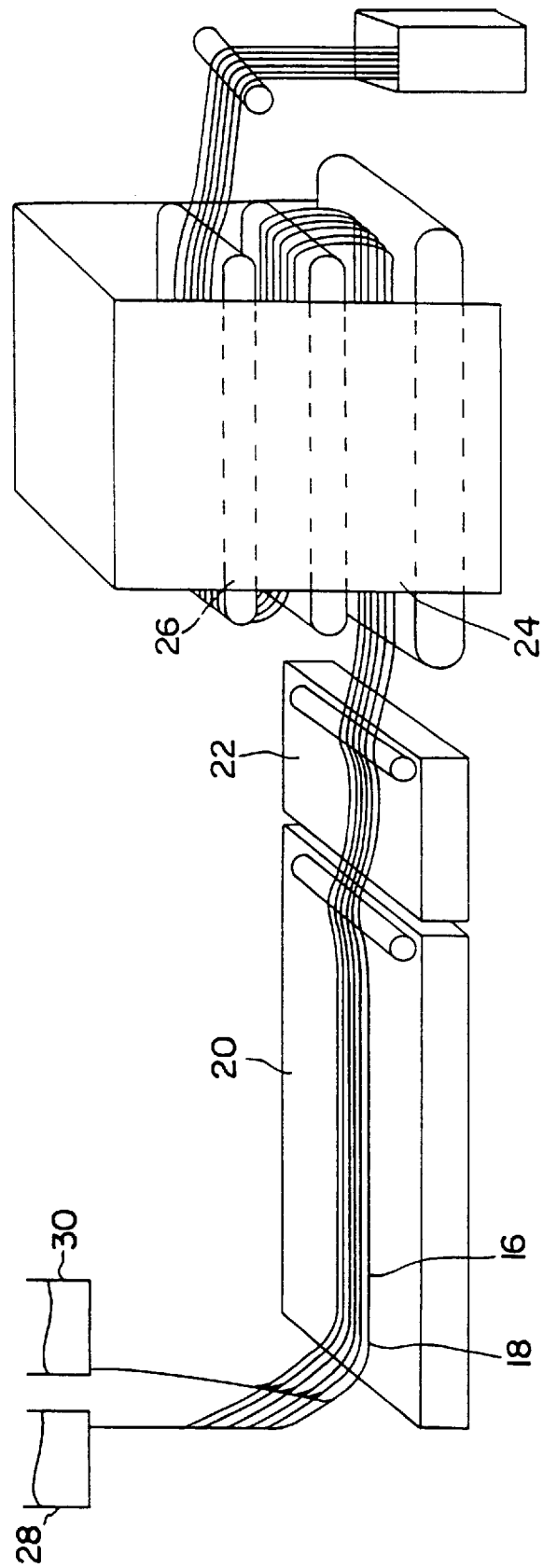

Referring to FIG. 2, one preferred method involves flowing a coaxially coextruded uncoagulated rubber latex stream 16 from a glass nozzle 18 into an acetic acid bath 20. The uncoagulated rubber in the stream coagulates and hardens in the acetic acid bath. The coagulated rubber thread is rinsed in a water bath 22, and passes into an oven in which the rubber thread is dried in drying zone 24 and cured in curing zone 26. The coagulation, rinse, dry and cure steps are performed in a conventional manner.

Coextruded rubber stream 16 is composed of a core of uncoagulated natural or synthetic rubber latex coextruded with a jacket of uncoagulated natural or synthetic rubber latex. The uncoagulated rubber latex used for the core is stored in reservoir 28, and the uncoagulated natural or synthetic rubber latex used for the jacket is stored in reservoir 30. The uncoagulated latex feeds by gravity into plastic tubes, and then may be coextruded as illustrated in FIGS. 3 and 4.

The jacket may be used to adhere the adjacent, touching treads into a flat tape which cannot be readily separated back to its component threads.

Figure 3:
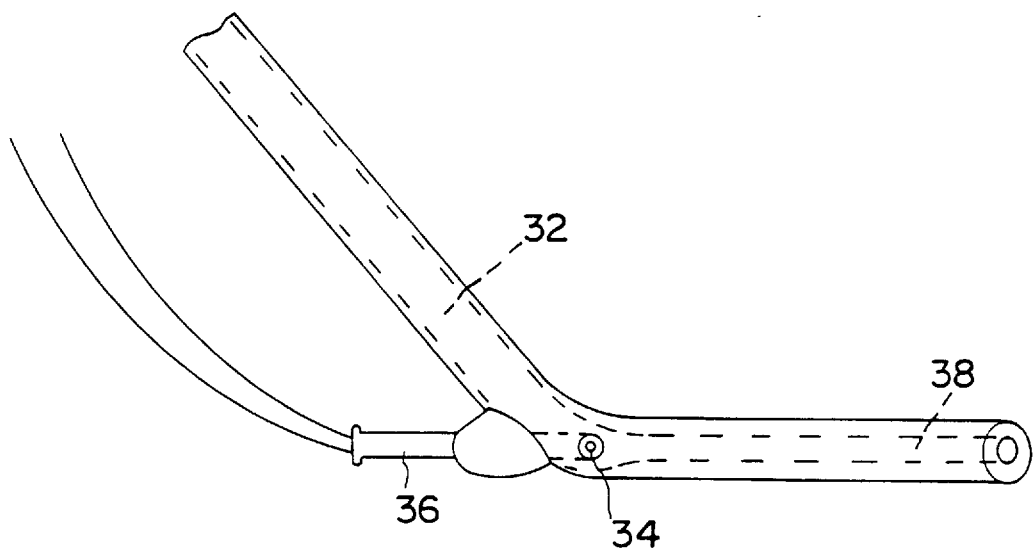
FIGS. 3 and 4 are perspective views of two assemblies for coextruding a rubber thread having two rubber portions.

Referring to FIG. 3, a stream of uncoagulated natural or synthetic rubber flows via plastic tubing from reservoir 30 into glass tube 32 (0.156 inch ID), and at a curve flows around the exit of nozzle 34. Nozzle 34, being the end of glass tube 36 (0.058 inch ID), is connected by plastic tubing to reservoir 28, and is positioned so that a stream of uncoagulated natural rubber is extruded into the center of the natural or synthetic rubber stream flowing from tube 32 to provide coextruded rubber stream 16 in tube 38 (0.058 inch ID).

Figure 4:
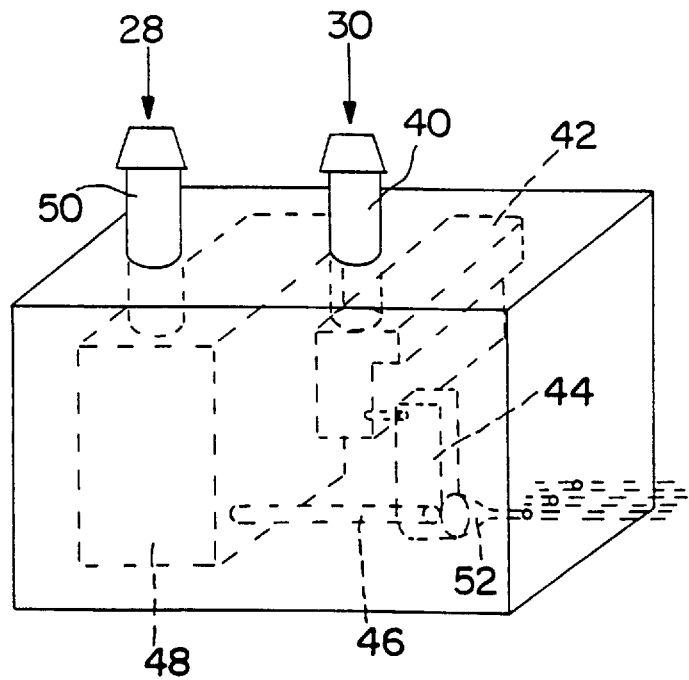

Alternatively, referring to FIG. 4, uncoagulated natural or synthetic rubber flows from external supply reservoir 30 through tube 40 (0.125 inch ID) into manifold chamber 42 (0.625 inch×1.125 inch×0.250 inch). The rubber then feeds from manifold chamber 42 through a tube (0.0312 inch ID×0.500 inch long) into individual chamber 44 (0.125 inch×0.125 inch×0.750 inch), where the stream of uncoagulated natural or synthetic rubber flows to surround tube 46 (0.055 inch ID) as it approaches the exit of the chamber. Tube 46 connects to chamber 48 (0.250 inch×1.640 inch×0.800 inch), which in turn is connected to reservoir 28 through tube 50 (0.250 inch ID). Uncoagulated natural rubber flows from reservoir 28 into chamber 48. It then flows through tube 46, and is extruded into the center of the uncoagulated natural or synthetic rubber stream to provide a two part rubber stream 16 (0.161 inch diameter). The two rubber parts are coextruded through exit port 52 (0.055 inch diameter), into the acetic acid bath. All components are composed of PTFE, with the exception of tube 46, which is made of stainless steel.

The flow of the rubber streams can be controlled by adjusting the height of the reservoirs, and by placing and adjusting thumbscrews on the plastic tubes connecting the coextrusion nozzle to the reservoirs. The size of the core of the final thread relative to the jacket can be controlled, for example, by adjusting the flow rates of the respective core and jacket rubbers.

A 37 gauge rubber thread having a black core and a white jacket was made using the approach illustrated in FIG. 2. The core and the jacket had the following compositions:

| Component, % wt.* | Core | Jacket |
| --- | --- | --- |
| Natural rubber latex** | 79.46 | 78.37 |
| Alkali solution | 0.36 | 0.35 |
| Sulfur | 0.85 | 0.95 |
| Antioxidant | 1.00 | 0.99 |
| Mercaptobenzothiazole activator | 0.90 | 1.00 |
| Fatty acid soap | 0.19 | 0.18 |
| Inert filler | 4.94 | 0 |
| ZnO | 1.24 | 1.22 |
| Dithiocarbamate cure accelerator | 0.08 | 0.07 |
| Black pigment | 0.21 | 0.00 |
| White pigment | 0.00 | 5.85 |
| Additional colorant | 0.00 | 0.71 |
| Water | 10.77 | 10.26 |

*All components are reported on an as received basis, unless indicated otherwise.
**The latex averaged 63% total solids, achieved by blending of conventional creamed and centrifuged rubber lattices.

The alkali (e.g., a 45% potassium hydroxide solution) and fatty acid soap stabilize the latex; the sulfur provides the crosslinks to develop the desired mechanical/physical properties; the antioxidant (e.g., Wingstay L) slows oxidative deterioration; the inert filler (e.g., Kaolin Clay) increases the specific gravity of the black pigment; the ZnO, mercaptobenzothiazole, and dithiocarbamate accelerate the cure and enhance physical properties; the black pigment provides the core with its black color; the white pigment (e.g., $TiO_2$) and additional colorants provide the jacket with its color; and the water is used to achieve the correct viscosity.

Referring to FIG. 5, a second preferred method of making rubber thread 10 involves forming a coagulated natural rubber thread 54, which ultimately will be the core of rubber thread 10, in the conventional way in an acetic acid bath to coagulate the natural rubber. The thread then is washed in hot water bath 56, and then passed through dip tank 58.

Dip tank 58 includes an uncoagulated natural or synthetic rubber that ultimately will provide the jacket of rubber thread 10. Examples of natural rubbers that can be used include NC-358, 407, and 411, all of which are available from Ennar Latex. Examples of suitable synthetic rubbers include nitriles like Perbunan N Latex VT from Bayer Corp., Pittsburgh, PA. If a natural rubber is used, the dip material preferably has a pH of between 10 to 12. If a nitrile rubber is used, the dip material preferably has a pH of between 9 and 11.5, and also preferably includes 0.2% to 3% of a sensitizer such as Basensol HA5 from BASF Corp., Charlotte, N.C., by weight. If a chloroprene rubber is used, the dip material preferably has a pH of between 9.5 and 12.0. The dip tank preferably includes between 15% and 35% of the uncoagulated rubber by weight, and the dip material preferably has a viscosity of between 5 cps and 40 cps.

Coated thread 54 then passes over a roller 60 that has been wetted by either an uncoagulated rubber material, hot water, or a coagulant solution. The coagulant solution can be used when the coating material is natural, nitrile, or chloroprene rubber. The surface tension of the solution preferably is under 40 dynes/cm; 28 dynes/cm is more preferred. The specific gravity (concentration) of the solution may be between 1.03 and 1.16. A roller coated with hot water is preferred when the coating material is a temperature sensitive latex such as LN372C (available from BASF). Hot water also may be used when blends of chloroprene are used as the coating material.

The coated thread then is dipped in coagulation bath 62 to complete the coagulation of the latex. An example of a preferred coagulant bath consists of a calcium chloride solution (specific gravity 1.07, surface tension 32 dyne/cm). Calcium nitrate can also be used as the coagulation agent. The thread then is washed in water bath 64, and then passes into the standard drying/curing oven.

Alternatively, the coagulant may be applied to the uncoagulated coating by misting or spraying.

Rubber thread 54 is pulled from the acetic acid bath at speeds of between 20 feet and 60 feet per minute. A one to five percent increase in speed preferably is provided by subsequent rollers to stretch the thread.

The thickness of the coating (jacket) provided by the dip process may be between 0.00025 inch and 0.003 inch on a thread that has a total diameter of 0.035 inch. Under these circumstances, the coating is between 3% and 30% of the rubber thread by weight.

The dip process can also be used with rubber thread that has been partially or fully dried and cured in an oven. After the thread comes out of the oven, it can be sent through the dip process (wash, coat, coagulate, wash) at a speed, for example, of 60 feet per minute.

Other embodiments are within the claims. For example, the nozzle 34 in FIG. 3 and tube 46 in FIG. 4 can be positioned so that the uncoagulated natural rubber is injected into the side of the uncoagulated natural or synthetic rubber stream to provide a rubber thread having a stripe (where a colorant is used in the uncoagulated natural rubber), or a rubber thread in which the natural rubber position is located at other off-center positions within the thread when examined in cross-section. In addition, in this embodiment and others, both positions of the thread can be composed of synthetic rubbers.

Figure 6:
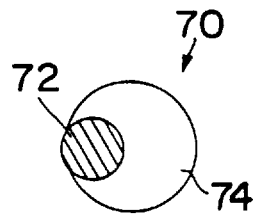
FIGS. 6–12 are cross-sectional views of rubber threads having two or more rubber portions.
Figure 7:
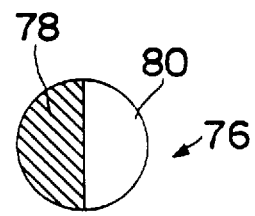
Figure 8:
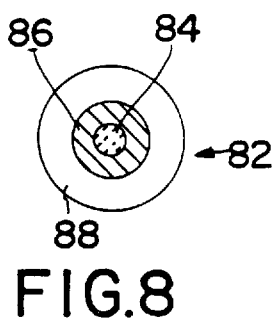

Some alternative embodiments are illustrated in FIGS. 6–13. Referring to FIG. 6, a rubber thread 70 includes a core 72 and a jacket 74, arranged in a non-concentric manner so that core 72 provides a striped surface. Referring to FIG. 7, a rubber thread 76 includes first rubber portion 78 and second rubber portion 80, having a different color than portion 78. Threads 70 and 76 may be made by coextrusion techniques.

Figure 9:
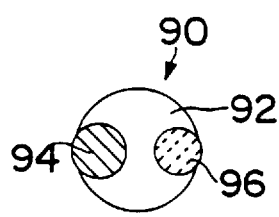
Figure 10:
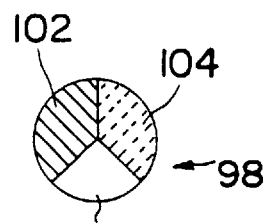
Figure 11:
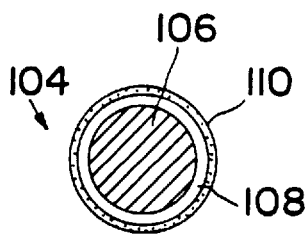

The rubber thread may include more than two rubber portions. For example, referring to FIG. 8, rubber thread 82 includes core 84, inner jacket 86, and outer jacket 88, arranged in a concentric manner. Referring to FIG. 9, thread 90 includes a first rubber portion 92, second rubber portion 94, and third rubber portion 96, arranged in a non-concentric manner so that portion 94 and 96 provide the thread with a striped surface. Referring to FIG. 10, rubber thread 98 includes a first rubber portion 100, a second rubber portion 102, and a third rubber portion 104, each having a different color. Threads 82, 90, and 98 also may be made by coextrusion.

A rubber thread having three rubber portions also may be prepared by dip coating. For example, referring to FIG. 11, rubber thread 104 includes a rubber core 106 (made in a conventional manner), an inner rubber coating 108, and a rubber outer coating 110. Coatings 108 and 110 may be applied sequentially by dip coating methods analogous to those described previously.

Figure 12:
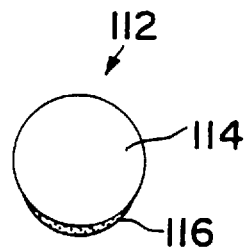
Figure 13:
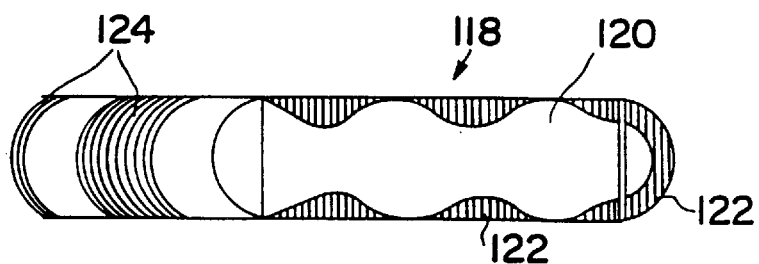
FIG. 13 is a perspective view of a rubber thread having more than one rubber portion.

Roll coating may be used to prepare rubber thread having two or more distinct rubber portions. Referring to FIG. 12, rubber thread 112 includes a rubber core 114, prepared by conventional methods, which can be roll-coated to provide a rubber portion 116 covering part of the surface of core 114. Portion 116 may have a color different from core 114 to provide a striped thread.

The rubber thread also may have a core and jacket portion that vary in thickness. For example, referring to FIG. 13, a rubber thread 118 includes a core 120 and a jacket 122 that varies regularly in thickness along the entire axial length of the thread. Jacket 122 reduces in thickness to essentially zero at intermittent points along the core; if jacket 122 has a different color than core 120, the thread is provided with circumferential stripes 124 along its exterior.

We claim:

1. A rubber thread comprising, in cross-section, a first rubber portion comprising a natural rubber and a second rubber portion comprising a synthetic rubber.

2. The rubber thread of claim 1, wherein said first portion is centrally-located in said rubber thread, and said second rubber portion surrounds said first rubber portion.

3. The rubber thread of claim 2, wherein said second rubber portion includes a colorant that provides it with a color that is different than the color of said first rubber portion.

4. The rubber thread of claim 2, wherein said second rubber portion is more resistant to abrasion than said first rubber portion.

5. The rubber thread of claim 2, wherein said second rubber portion is more resistant to ultraviolet light than said first rubber portion.

6. The rubber thread of claim 2, wherein said second-rubber portion is more resistant to solvents or other chemicals than said first rubber portion.

7. The rubber thread of claim 2, wherein said second rubber portion is more resistant to fire than said first rubber portion.

8. The rubber thread of claim 2, wherein said second rubber portion is less likely to provide an allergic response than said first rubber portion.

9. The rubber thread of claim 2, wherein said second rubber portion comprises between 2% and 80% of said rubber thread by weight.

10. The rubber thread of claim 2, wherein said second rubber portion comprises a nitrile rubber.

11. The rubber thread of claim 2, wherein said second rubber portion comprises a chloroprene rubber.

12. The rubber thread of claim 2, wherein said second rubber portion comprises a butyl rubber.

13. The rubber thread of claim 12, wherein said first rubber portion includes a colorant that provides it with a different color than said second rubber portion.

14. The rubber thread of claim 2, wherein said second rubber portion comprises a polyurethane rubber.

15. The rubber thread of claim 2, wherein said second rubber portion comprises a styrene-butadiene rubber.

16. The rubber thread of claim 2, wherein said second rubber thread comprises a synthetic polyisoprene rubber.

17. The rubber thread of claim 2, wherein said second rubber portion comprises a rubber selected from the group consisting of nitrile rubber, chloroprene rubber, butyl rubber, polyurethane rubber, styrene-butadiene rubber, natural rubber, synthetic polyisoprene rubber, or a blend including two or more of the foregoing rubbers.

18. The rubber thread of claim 1, further comprising, in cross-section, a third rubber portion in addition to said first rubber portion and said second rubber portion.

19. A rubber thread comprising, in cross-section, a first rubber portion surrounded by a second rubber portion having a composition different from said first rubber portion.

20. The rubber thread of claim 19, wherein said first rubber portion comprises a natural rubber and said second rubber portion comprises a synthetic rubber.

21. The rubber thread of claim 20, wherein said synthetic rubber is a nitrile rubber.

22. The rubber thread of claim 20, wherein said synthetic rubber is a chloroprene rubber.

23. The rubber thread of claim 20, wherein said first portion is centrally-located in said rubber thread.

24. The rubber thread of claim 19, wherein said second rubber portion includes a colorant that provides it with a color that is different than the color of said first rubber portion.

25. The rubber thread of claim 19, wherein said second rubber portion is more resistant to abrasion than said first rubber portion.

26. The rubber thread of claim 19, wherein said second rubber portion is more resistant to ultraviolet light than said first rubber portion.

27. The rubber thread of claim 19, wherein said second rubber portion is more resistant to solvents or other chemicals than said first rubber portion.

28. The rubber thread of claim 19, wherein said second rubber portion is more resistant to fire than said first rubber portion.

29. The rubber thread of claim 19, wherein said second rubber portion is less likely to provide an allergic response than said first rubber portion.

30. The rubber thread of claim 19, wherein said second rubber portion comprises between 2% and 80% of said rubber thread by weight.

31. The rubber thread of claim 19, wherein said second rubber portion comprises a butyl rubber.

32. The rubber thread of claim 19, wherein said second rubber portion comprises a polyurethane rubber.

33. The rubber thread of claim 19, wherein said second rubber portion comprises a styrene-butadiene rubber.

34. The rubber thread of claim 19, wherein said second rubber thread comprises a synthetic polyisoprene rubber.

35. The rubber thread of claim 19, wherein said second rubber portion comprises a rubber selected from the group consisting of nitrile rubber, chloroprene rubber, butyl rubber, polyurethane rubber, styrene-butadiene rubber, natural rubber, synthetic polyisoprene rubber, or a blend including two or more of the foregoing rubbers.

36. The rubber thread of claim 19, further comprising, in cross-section, a third rubber portion in addition to said first rubber portion and said second rubber portion.

37. The rubber thread of claim 19, wherein the rubber thread is substantially circular or elliptical in shape.

38. A rubber thread comprising, in cross-section, a first rubber portion and a second rubber portion having a different composition than said first rubber portion and being an uncoagulated latex compound.

* * * * *